United States Patent [19]

Northup

[11] 4,336,050
[45] Jun. 22, 1982

[54] METHOD FOR MANUFACTURING GLASS BOTTLES

[75] Inventor: John D. Northup, 2460 Underhill Rd., Toledo, Ohio 43615

[73] Assignees: John D. Northrup, Jr.; Ruth Northup; Nancy Northup Lehrkind; Mary Northup

[21] Appl. No.: 173,078

[22] Filed: Jul. 28, 1980

Related U.S. Application Data

[63] Continuation-in-part of Ser. No. 112,845, Jan. 17, 1980, abandoned.

[51] Int. Cl.$^3$ .............................................. C03B 11/10
[52] U.S. Cl. .......................................... 65/82; 65/68; 65/77; 65/321
[58] Field of Search .................. 65/68, 71, 78, 79, 80, 65/81, 82, 321

[56] References Cited

U.S. PATENT DOCUMENTS

| | | | |
|---|---|---|---|
| 771,581 | 10/1904 | Sievert | 65/80 |
| 944,053 | 12/1909 | Savage | 65/321 X |
| 1,197,837 | 9/1916 | Loper et al. | 65/321 X |
| 1,292,051 | 1/1919 | Rau | 65/80 |
| 2,289,046 | 7/1942 | Rowe | 49/5 |
| 3,024,571 | 3/1962 | Abbott et al. | 49/37 |
| 3,607,206 | 9/1971 | Foster et al. | 65/307 |
| 3,622,305 | 11/1971 | Becker | 65/229 |
| 3,644,111 | 2/1972 | Becker | 65/158 |
| 3,765,862 | 10/1973 | Rowe | 65/229 |
| 4,009,016 | 2/1977 | Foster | 65/76 |
| 4,013,437 | 3/1977 | Northup | 65/76 |

Primary Examiner—Arthur D. Kellogg
Attorney, Agent, or Firm—Richard D. Emch

[57] ABSTRACT

A method of forming parisons in machines for making glass bottles which includes introducing a gob of molten glass into a blank mold, moving a cavity plunger to form a parison cavity and subsequently subjecting the gob to a predetermined pressure separate from the cavity plunger to apply pressure urging the molten glass into conformity with the mold.

4 Claims, 6 Drawing Figures

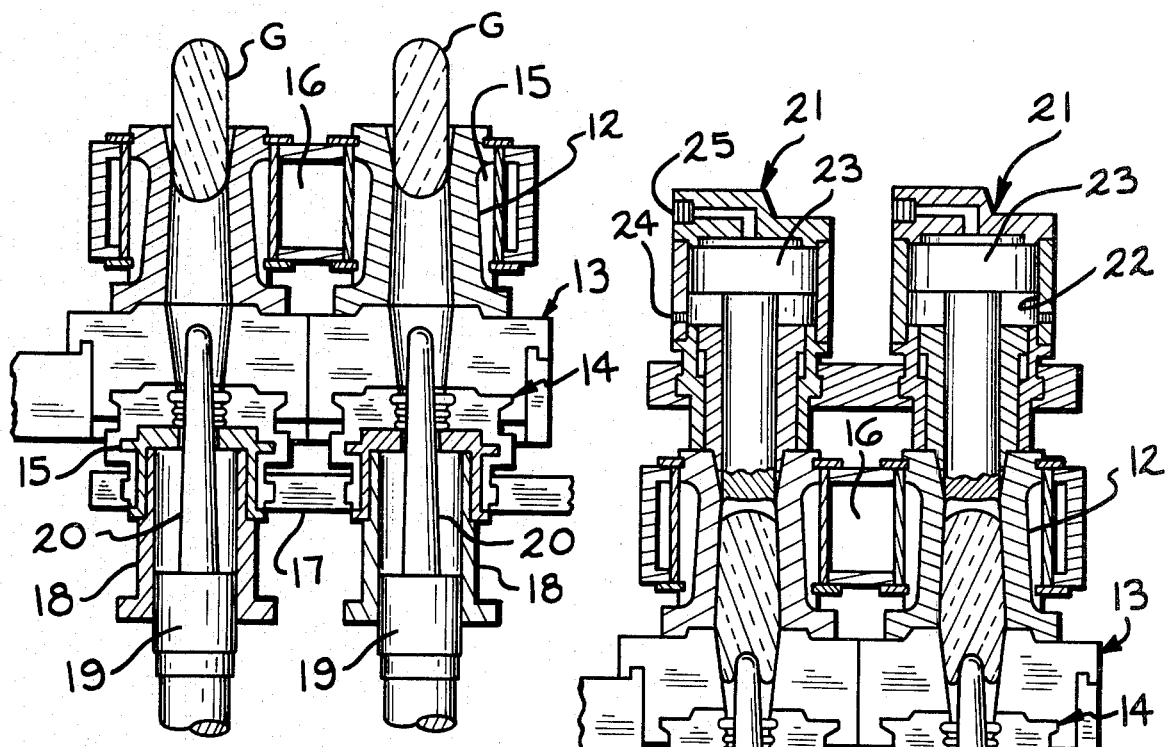
FIG. 1
FIG. 2
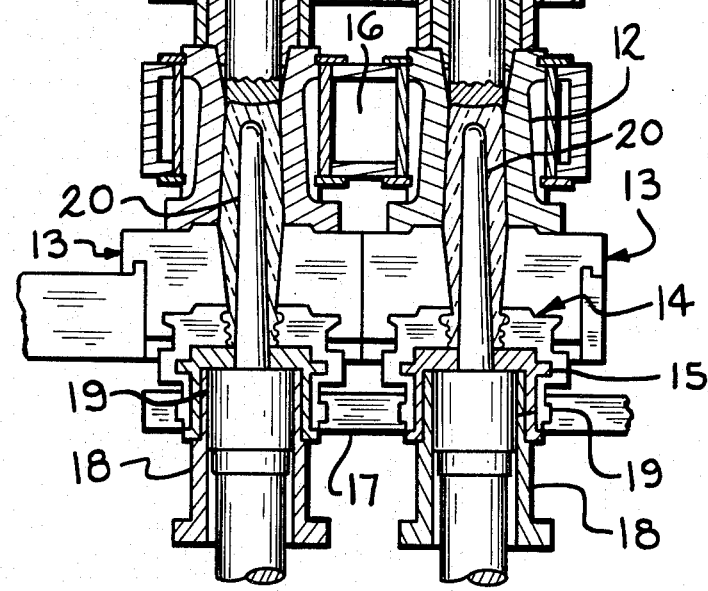
FIG. 3

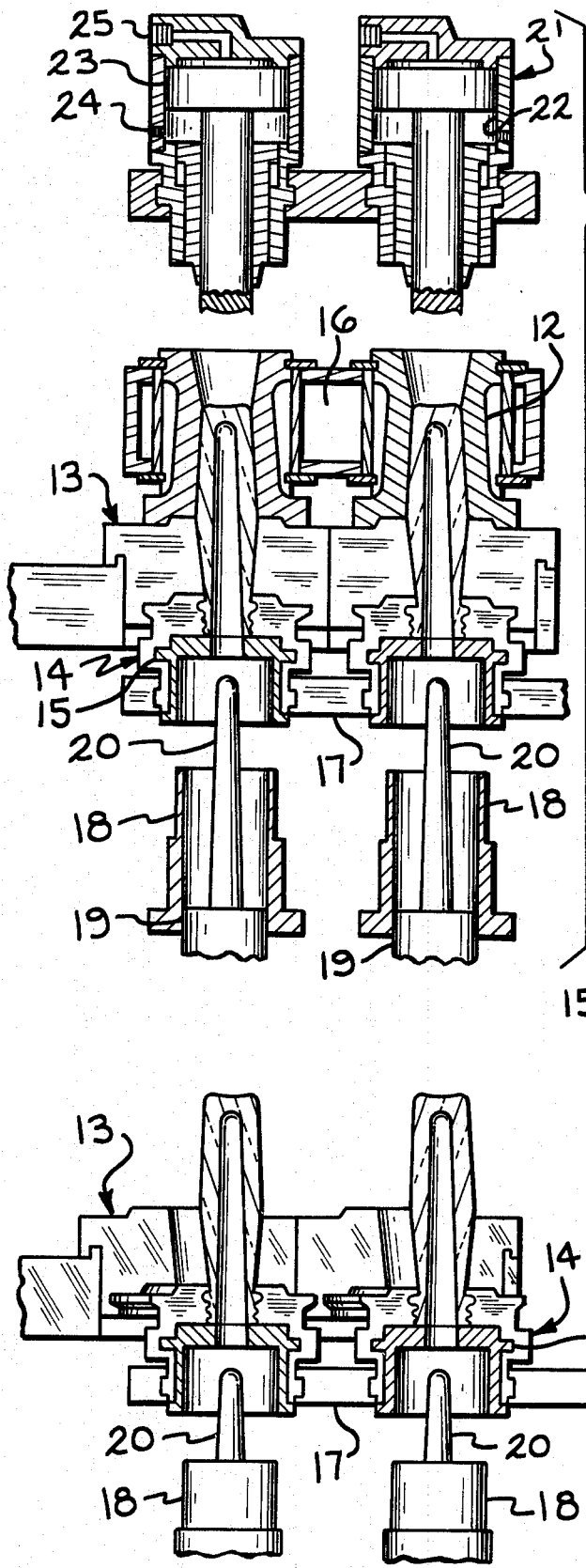
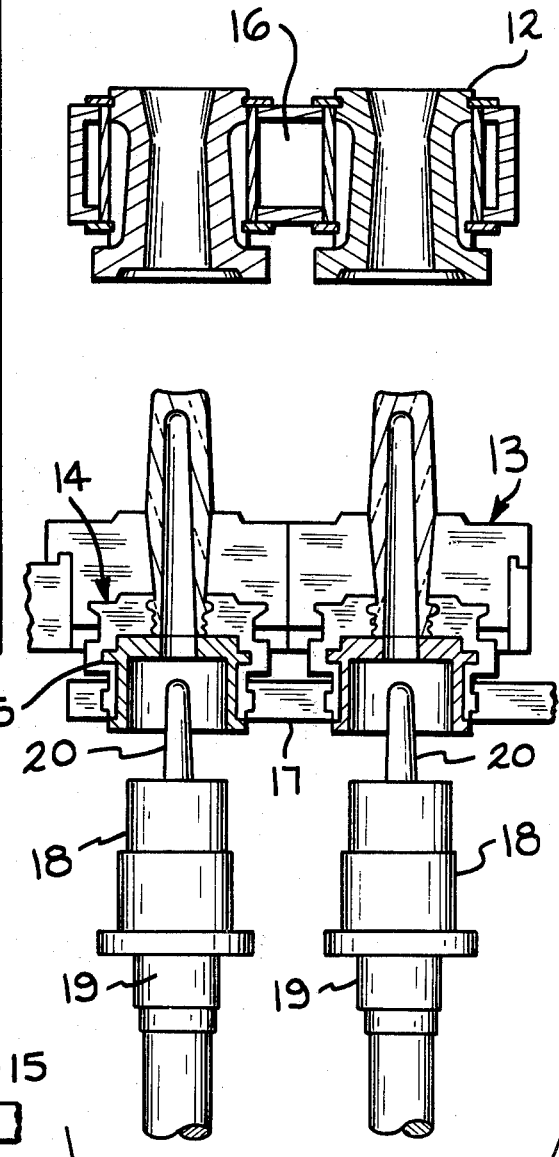
FIG. 4
FIG. 5
FIG. 6

METHOD FOR MANUFACTURING GLASS BOTTLES

RELATED APPLICATION

This application is a continuation-in-part of application, Ser. No. 112,845, filed Jan. 17, 1980 now abandoned.

BACKGROUND OF THE INVENTION

The so-called narrow-neck press-and-blow method of manufacturing glass bottles is well known. Examples of this process are disclosed in Mumford, U.S. Pat. No. 3,216,813; Becker, U.S. Pat. No. 3,622,305; Becker, U.S. Pat. No. 3,644,111; Rowe, U.S. Pat. No. 3,765,862; and Foster, U.S. Pat. No. 4,009,016. Refinements have been made in the control of the process in an effort to make the blown bottles lighter in weight and more uniform in wall thickness.

The successful operation of the process in bottles having a 26 mm crown finish or 28 mm thread finish (which are the predominant beer and beverage sizes) depends on the maintenance of the volume of the blank cavity and the pressing plunger as well as the volume of the gob of glass to extremely exact specifications. Most bottle manufacturers do not attempt to operate the process on finishes below 38 mm in size because the cost of maintaining these close specifications exceeds the economic advantage of being able to reduce the weight of the glass in the bottle by the more uniform distribution of glass.

The need for this close specification control is created by the fact that the inside diameter of these finishes is only ¾ of an inch, necessitating a pressing plunger diameter only slightly larger. The pressing plunger must be tapered in order to be withdrawn from the glass after the parison has been sufficiently chilled, because the glass shrinks around the plunger as it cools. The pressing plunger must also have a close fit with the guide ring in order to prevent the molten glass from squeezing into the joint between them and forming a rough seam on the finish of the bottle. Such a seam is highly objectionable for obvious reasons.

In this known press-and-blow process, whenever the volume of the hot glass exceeds the volume of the blank and finish cavity minus the volume of the plunger, an over-press results. If the volume of the hot glass is less than the volume of the blank and finish cavity minus the volume of the plunger, no pressing occurs because the fluid mass of glass is not confined. Obviously, the volume of the plunger in the blank and finish cavity varies by the amount of the penetration of the plunger. In the known process the variation in penetration is less than ¼ of an inch, but it is continuously varying due to the variations in mold cavities and gob volumes. A normal set of blank cavities in this process consists of 24 to 40 individual cavities (including spares). The glass is supplied from two orifices supplying gobs at speeds of one hundred to one hundred thirty per minute from each orifice. The number of combinations of degree of variance is substantial.

With the continual variations in cavity capacity and glass gob volume the amount of penetration of the plunger into the blank mold varies from parison to parison. The result is a continual and substantial variation from one parison to another in the thickness of the glass between the top of the plunger and the surface of the baffle which seals the blank cavity. There is also a lesser but continual variation in the thickness of the side walls of the parison due to the taper of the plunger.

The primary object of the present invention is to produce glass bottle parisons in a narrow-neck press-and-blow operation by providing a process which is less demanding of maintenance of equipment and precision operations than present methods. The resulting parisons are more consistent in finish quality, wall thickness and bottom thickness and therefore capable of being expanded into bottles having improved glass distribution compared to present commercial production methods.

This objective is accomplished by using the mold cavity plunger only as a device to produce a bubble or cavity in the parison and limiting its travel to a predetermined position where it makes the best possible match with the guide ring (or the neck ring in the event that a guide ring is not used). The necessary pressure on the fluid mass of glass is provided separate from the cavity forming plunger. In one embodiment baffle means include a plunger means which is pressed against the fluid mass of the glass with the necessary force to produce the desired physical and thermal formation of the parison. In other embodiments a fluid is introduced into the mold and the fluid or gas pressure against the fluid mass provides the necessary force.

The providing of parisons having improved uniform size and shape and in which the glass distribution is consistent makes it possible to make bottles having improved glass distribution and strength and of lighter weight. Reduction in bottle weight is of primary importance since such reduction means a saving in energy cost, material cost, and transportation cost. Reducing the weight of a particular bottle enables faster cooling in the blow mold and often greater production per minute per mold cavity.

No one wishes to reduce the strength of the completed glass container. To measure the strength there are many tests such as vertical load tests, internal pressure tests and impact tests. On the basis of experience with test measurements, standards have been developed for minimum glass thickness allowable in the base, the heel, the sidewall, and the shoulder area of the glass bottle. There is also a minimum glass thickness for the wall of the finish which is required for satisfactory performance on filling machines and capping machines. The present invention makes it easier to produce blown containers by the press-and-blow process to meet all of the applicable customer standards with which I am familiar.

Much of the improved glass distribution in the finished bottle starts from improvement in the formation of the parison. Present practice produces a parison which is close to the height of the finished blow mold cavity so that blowing of the parison in the blow mold can start shortly after the delivery of the parison to the blow mold and the time required for the parison to sag in the blow mole is reduced. However, such long parisons are more difficult to control in the transfer from the blank mold to the blow mold and, further, exhibit variations in the glass distribution which are minimized by the present invention.

BRIEF DESCRIPTION OF THE DRAWINGS

The accompanying drawings show apparatus used to carry out the present method. In the drawings, FIG. 1 is a central vertical sectional view of a parison forming machine which will carry out the present method with a gob of glass being introduced into the blank mold;

FIG. 2 shows the blank mold closed by a baffle assembly at the upper end and a cavity plunger in the loading position at the lower end;

FIG. 3 is a central vertical sectional view showing both the cavity plungers and the baffle pressing plungers advanced;

FIG. 4 shows the formed parison with the pressing plunger retracted and the baffle assembly removed;

FIG. 5 shows the blank mold removed from the parison; and,

FIG. 6 shows the shoulder mold swung out of position and the formed parisons ready for delivery to the blow mold, supported only by the conventional neck rings and guide rings.

DETAILED DESCRIPTION OF THE PREFERRED EMBODIMENTS

As shown in FIG. 1, a blank mold is provided which comprises a solid body section 12, a split shoulder section 13 and a split neck ring section 14. By using a so-called "solid" body section any parison produced in accordance with the present method does not have any vertical seams therein as would be produced if a split blank mold section were used in this location. Therefore, a much more uniform parison wall cooling and resulting thickness is achieved. However, a more conventional split body mold may be used.

Cooling air is blown around the exterior of the body mold section 2 from a wind box 16.

The split shoulder mold 13 is carried by a conventional blank mold arm. The split neck ring 14 is carried by a conventional split invert arm 17, the two halves being held in alignment by an annular guide ring 15. A lower guide sleeve 18 having a plunger holder 19 thereon is provided which plunger holder carries a cavity plunger 20 which is capable of being advanced longitudinally into the gob for the purpose of forming a bubble or central cavity therein. The cavity plunger 20 makes exactly the same stroke on each operation, as contrasted with many known machines in which the stroke varies from one operation to the next depending on gob volume and pressure requirements. The plunger actuating mechanism is movable from a free position to a position at which the plunger 20 is brought into match with the guide ring 15. The plunger 20 is normally hollow and is maintained at a desired temperature by either water or air internal cooling as is known in the art.

As shown in FIG. 2, a removable baffle assembly 21 is provided which can be swung into place over the blank mold to seal the blank cavity. The baffle assembly 21 includes a cylinder 22 having a piston 23 therein which is normally forced to its upper position by air entering the cylinder from below the piston through an opening 24. The piston 23 includes a pressing plunger 26.

Once the gob of glass G has been introduced into the blank mold as shown in FIG. 1, it sags quickly down over the cavity plunger 20. Thereafter, the cavity plunger 20 is advanced to a position where it matches the guide ring 15 and neck ring 14 as shown in FIG. 3. Almost immediately thereafter, air is introduced into the top of the baffle carrying cylinder 22 through an opening 25 and the top piston 23 is advanced with the pressing plunger 26 applying a predetermined pressure on the parison from above. It will be noted that the piston 23 does not bottom out against the lower end of the cylinder 22 so that any very slight variation in the weight and size of the gob will make no difference. The molten glass as a fluid mass is subjected to a uniform pressure on all surfaces. The lower cavity plunger 20 function is positional to produce the "match" at the finish end and to produce the cavity described while the upper piston travel is responsive only to the pressure in cylinder 22 and the resistance of the confined fluid mass. In the practice of the present method there is a relationship between the volume of the bubble produced by the cavity plunger 20 and the volume of the entire blank mold cavity. This volume ratio is at least 20% and preferably greater than 30%. The volume ratio does not exceed 75%.

When the parison has been sufficiently chilled by heat transfer into the mold parts, the baffle mechanism 21 can be removed upwardly as shown in FIG. 4 and lower bubble forming mechanism can be lowered as also shown in this Figure, thus withdrawing the lower cavity plunger 20.

The blank body mold 12 is then removed from the glass parison as is shown in FIG. 5.

As shown in FIG. 6, the shoulder mold halves are now swung open and the parison is held at its finish end only by the neck ring and the guide ring in a conventional manner and is cleared for transfer to a blow mold.

Summarizing the preferred method of the present invention, a premeasured gob "G" of molten glass is introduced into the mold cavity. The cavity plunger 20 is inserted into the mold cavity and gob "G" to form a parison cavity having a volume which is at least 20% but not more than 75% of the volume of the mold cavity. While retaining the cavity plunger 20 in the mold cavity the baffle means or pressing plunger 26 is moved against the gob "G" to apply a predetermined pressure throughout the gob "G". This urges the molten glass into conformity with the mold cavity configurations. The molded parison is then cooled. Preferably, the neck portion of the parison is cooled to a higher temperature than the body portion in the final parison formation. Referring to FIG. 3, the thickness of the wall of the molded parison is greater in the body portion and generally thinner in the neck portion adjacent the juncture of the split mold 13 with the neck ring 14. Because of its thinner section, the neck portion would tend to be colder than the body portion when the parison formation is complete. In the preferred method of the present invention the lesser cooling applied to the neck portion is such that the neck portion is normally at a higher temperature than the body portion when the parison formation is complete.

In other embodiments of the present invention the baffle assembly 21 is not utilized to provide the predetermined pressure on the gob "G". Rather, after the plunger 20 is extended to form the parison cavity, as shown in FIG. 3, a fluid is introduced into the blank mold to act as a pressure source.

In one embodiment a predetermined amount of water is injected into the body 12 of the blank mold adjacent the gob "G". A baffle closes the mold. The predetermined amount of water is changed to steam by the temperature of the molten glass. This creates a predetermined pressure on the gob "G". This urges the molten glass into conformity with the mold cavity configurations. After the parison has cooled a predetermined amount, the steam is exhausted through openings provided in the mold baffle. The openings are sized to allow the steam to exhaust but not to allow molten glass to flow into them. After the steam is exhausted, the cavity plunger 20 is withdrawn. Compressed air is then injected through the opening created by the movement of the cavity plunger 20. This counter flow compressed air forces the partially cooled gob "G" into contact with the mold baffle and the adjacent mold surfaces to assure the formation of an enamel on the complete exterior surface of the parison. Cooling is then completed and the parison removed.

In still another embodiment, the fluid introduced to act as a pressure source is compressed air. In this embodiment, a baffle having air openings is positioned adjacent the body 12 to serve as an end of the blank mold. After the gob "G" is introduced, the plunger 21 is extended to a fixed position to form the bubble or parison cavity as mentioned above. Compressed air is applied through the baffle openings, acting as a separate source of pressure to force the fluid glass into conformity with the mold. Normally, the air is between 75 psi and 200 psi. After the glass has attained a desired cooling the high pressure compressed air is stopped. The plunger 21 is withdrawn and counter flow compressed air is introduced through the opening created by the withdrawal of the plunger 21. The compressed air enters the parison cavity and forces the glass against the baffle and the surface of the mold. Any air remaining adjacent the baffle is forced through openings provided in the baffle. The parison after cooling is transferred from the mold.

What I claim is:

1. The method of forming a glass parison from which glass containers are formed, in a machine having at least one blank mold, the mold defining a cavity and having a cavity plunger and a pressing plunger adjacent the cavity which method comprises the steps of:
   introducing a premeasured gob of molten glass into the blank mold cavity, inserting the cavity plunger into the gob to form a parison cavity the volume of which is at least 20% of the volume of the blank mold cavity;
   retaining the cavity plunger in the parison cavity and applying pressure separate from the cavity plunger throughout the gob urging molten glass into conformity with the mold, wherein the separate pressure is applied by moving the pressing plunger against the gob.

2. The method of forming a glass parison from which glass containers are formed, in a machine having a sectional blank mold, the mold defining a cavity and having a cavity plunger positioned at one end of the mold and a pressing plunger positioned adjacent the other end of the mold, which method comprises the steps of:
   introducing a premeasured gob of molten glass into the blank mold cavity;
   inserting a cavity plunger into the gob to form a parison cavity the volume of which is at least 20% of the volume of the blank mold cavity;
   retaining the cavity plunger in the cavity and immediately thereafter moving the pressing plunger against the gob to apply pressure throughout the gob urging molten glass into conformity and the mold configurations;
   cooling the molded parison;
   opening the blank mold parts; and
   removing the completed parison from the blank forming position.

3. The method of forming a glass parison, according to claim 2, wherein movement of the pressing plunger is continued until a predetermined pressure is reached.

4. The method of forming a glass parison according to claim 2, wherein the parison includes a neck portion and a body portion, including the step of cooling the neck portion to a higher temperature than the body portion prior to removing the completed parison from the blank forming position.

* * * * *